July 13, 1937.  T. G. HITT  2,086,618
ROCKET
Filed June 10, 1936
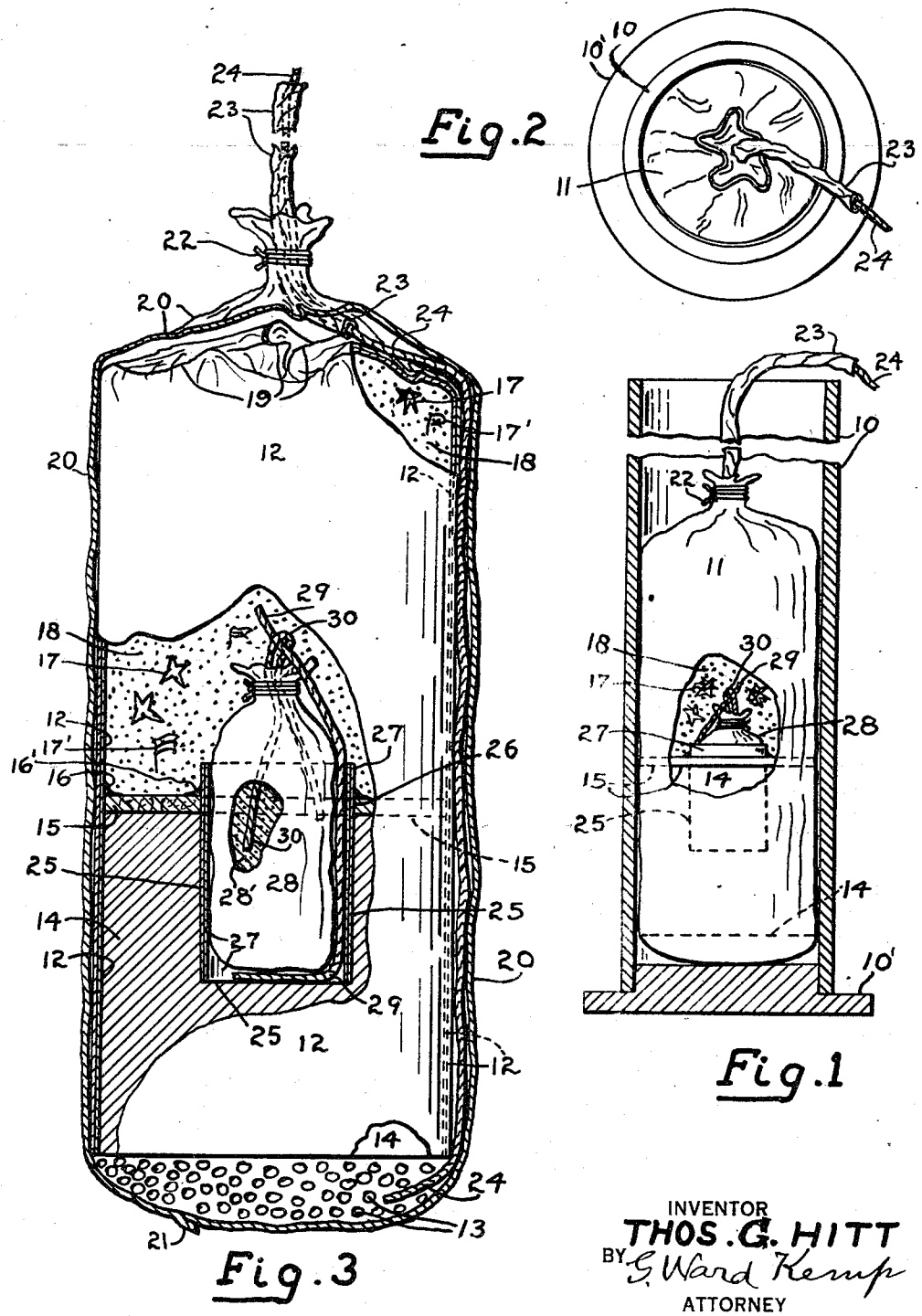
INVENTOR
THOS. G. HITT
BY G. Ward Kemp
ATTORNEY Patented July 13, 1937

2,086,618

UNITED STATES PATENT OFFICE 2,086,618

ROCKET

Thomas G. Hitt, Seattle, Wash.

Application June 10, 1936, Serial No. 84,495

2 Claims. (Cl. 102—23)

This invention relates to rockets, and particularly to rockets of the comet type, for pyrotechnical displays, and for safety to spectators and property.

In the construction of ordinary rockets, a propelling charge of explosives is packed into a carrying tube of considerable length and weight, which is guided in upward flight by a stick of considerable weight and length. When the rocket has reached its limit of travel and the explosive is consumed, the heavy tube and stick fall to the ground and thereby imperil spectators and property. Such self propelling rockets forcibly discharge a stream of fire when ignited, and so require a safe distance from spectators, and must be started from a location where such fire will not cause damage to property. Such rockets also create a loud roar during their ascent.

It is therefore an object of this invention to provide a rocket in small and compact form, which may be fired from a culverin or mortar, and which will then ascend quietly, and at the top of its flight discharge any desired decorations, signals etc., and then all remaining parts to be blasted into harmless particles.

A further object of the invention is to provide a rocket body, with a charge of gun powder at its base, whereby the rocket may be propelled from a fixed mortar. Such rocket to comprise a block of compressed slow burning chemicals immediately above and adjacent to such gun powder to be ignited thereby, and to produce a spectacular stream of rocket fire in the ascending flight, with little noise, and to provide in the head of such rocket any desired number of decorative articles, to be scattered without injury thereto when such rocket has reached its limit of flight.

A still further and particular object of the invention is to provide in the upper side of said block a depression or well, and division plate over and across such block with an aperture therethrough, and to provide a tube to extend down through such aperture and well and to enclose a sack of detonating explosive for blasting and destroying all remaining parts of such rocket after such display articles have been scattered.

With these and other objects, to be hereinafter stated, I have illustratively exemplified my invention by the accompanying drawing, of which:

Special objects are also, to provide a safety rocket of simple form of construction for low cost of manufacture, with a new mode of assembly, including a block combustible chemicals, to provide a plurality of objects and all to produce a new result.

Figure 1 represents a front elevation of the assembled rocket, within a mortar, with parts of the rocket broken away, and the mortar in section, Figure 2 represents a top plan, Figure 3 is an enlarged detail view of the rocket, with parts broken away to disclose the interiors, and the outside covering in section.

Like numerals on the different figures represent like parts.

Numeral 10 represents a culverin, or mortar for projecting the rocket into the air. 11 represents the rocket as an entirety, particularly as seen in Figures 1 and 2. 12 represents the outer tubular shell or side walls of the rocket which are preferably formed of one or more thicknesses of tough combustible and thin paper for retaining the contents of the rocket together in transportation, and while being projected from the mortar.

At the base of the rocket shell is placed sufficient gun powder 13 to hoist or propel the rocket upward to the desired distance for wide exposition.

Packed within the walls above and adjacent to the powder is a block 14 formed of compressed combustible material suitable for producing a rich tail stream of colored spectacular fire and flames, during the travel of the projectile. Such material I have discovered by experiments may be pulverized charcoal, sulphur, and saltpetre, with aluminum or other chemicals for colors desired. These ingredients are first pressed together, to provide a hard block to both prolong or retard the combustion, and to provide an anvil for a later explosion.

Across and over the top of the block is positioned a stiff plate or disc of preferably heavy cardboard 15 for resistance and sound, with its periphery affixed to the shell, as by an adhesive 16. Above this plate, and filling the remainder or head and relatively larger chamber of the rocket shell, is placed any desired number, or varieties of display or decorative articles, such as stars, flags and destructible ornaments indicated symbolically as 17. Intermingled or below such articles is placed sufficient ordinary meal powder 18 to scatter said articles without injury thereto where such meal powder is exploded. Normally such articles and meal powder are retained in position by the folding and attaching thereover the tops of the sidewalls, as at 19.

An outside cover or envelope 20 is provided around the rocket walls, and is drawn together and connected beneath the bottom as at 21 for retaining the powder 13. It is also drawn together at the top above the walls and connected as at 22. From thence such envelope is extended or other suitable material is closely wound to provide a rope 23 or handle of suitable length whereby the rocket may be lowered into the propelling mortar. An ignition fuse 24 of suitable length is preferably wrapped inside this handle and thence carried down along the outside of the rocket wall and inside the protecting envelope 20 and then into the propelling powder 13 for igniting the same.

The important features for scattering the display articles, and next for destroying any remaining parts of the rocket are described as follows:

The block 14 is provided with a relatively small central depression or well 25 extending down from the plate 15, and said plate is provided with an aperture 26 therethrough corresponding with the sides of the well. Within this aperture is affixed a tube 27 preferably formed of rolls of paper or pasteboard, and which projects downward through said well, for the purpose of sustaining and protecting a relatively small package or sacks 28 filled with detonating explosive relatively light in weight for destroying parts of the rocket. A quick match or fuse 29 is also positioned or carried through such aperture with the top thereof opening into said meal powder for igniting the same, and the lower end thereof exposed to the bottom of the well.

The sack 28 is provided with a slow-match fuse, preferably in loop form 30 which extends from the detonating charge and up into the meal powder, and is there ignited by the burning of the latter, and then quickly thereafter causes the explosion of the detonating charge. The bottom of the sack is preferably formed of one or more layers of tough paper sufficient to resist the adjacent heat from the burning block, until the fire has been carried by the fuses up into the meal powder and thence back into the explosive in the sack.

The depth of the well into the block, and the timing of fuse 29 are so adjusted that when the fuse and meal powder are ignited that there will remain a sufficient upper portion of the block 14 to serve as an abutment or anvil beneath the plate, to resist the explosive effect of the meal powder and thereby cause a greater distribution of the ornamental articles.

Again the timing of the fuse 30 is so adjusted that when it is ignited by the burning meal powder, that the fire therefrom will be conveyed to the detonating powder, and the sack will be almost immediately exploded after said articles are scattered and all remaining parts of the walls and plate and tube will be torn to atoms by such last explosion.

The stiff plate and close fitting protecting tube tend to restrain the expansive force of the exploding sack and thereby increase the rending effect and increase the sound from such explosion.

The lower portion of the walls are burned with the block and the head portion is burned or shredded by the meal powder and by the time the final explosion occurs, the block will be almost or entirely burned, and if any broken fragments remain they will continue to burn until consumed. Thus all portions from the rocket of any substantial weight are either consumed or shredded into minute particles, and no injury to person or property can be done thereby.

The compactness of the rockets and without sticks, permits their distribution and transportation in small boxes, which is an important advantage economically, over the common forms.

The same mortar may be used for firing any number of the rockets, and this may be stationed in close proximity to persons or property without danger when in use.

In use the rocket is exceedingly spectacular. First a considerable sound and stream or fire from the mortar when the propelling charge is ignited. Next the rocket rushes comet-like upward in almost silence, with a stream of colored tail fire from the burning block. Then comes the explosion, and scattering from the head of the ornaments, followed by the final flash and loud crack from the detonating charge, and the destruction is completed with the display.

Having described my invention, I claim as new:

1. A pyrotechnic rocket adapted to be impelled from a mortar, comprising a tubular combustible container, provided with upper and lower chambers therein, a charge of gun powder at the base thereof to impel the rocket from said mortar, an ignition fuse extending from said powder along the outside of said container to a point above the same, a block of combustible chemicals compressed into and entirely filling said lower chamber for providing quiet spectacular rocket fire during the ascent of such rocket, said block provided with a central well in the top portion thereof for a detonating and blasting charge, said upper chamber filled with illuminating articles and meal powder for igniting and scattering the same, a quick match fuse extended from the base of said well and up into such meal powder, a destructible resistance plate positioned over and upon said block with the periphery thereof affixed to said container and provided with an aperture therethrough over said well, a holding tube extended through such aperture to the base of such well, a sack of detonating blasting explosive positioned in said holding tube, and a fuse extended down from such meal powder and into such sack for igniting such explosive therein, whereby all remaining parts of such rocket will be destroyed after the scattering of such display articles.

2. A pyrotechnic rocket of the comet type adapted to be impelled from a mortar, comprising, a tubular container, an upper chamber in the container filled with ornaments, and a lower chamber filled with a block of combustible chemicals, for tail fire and hoisting anvil, a charge of gun powder packed beneath said block for hoisting said rocket when ignited, an ignition fuse extended from said hoisting powder and upward along the outside of said container to above the top thereof, a wrapping on the upper portion of said fuse to reinforce the same and to provide a handle for lowering said rocket into a mortar without danger to the hands of the operator in event of a premature explosion in said mortar.

THOMAS G. HITT.